United States Patent [19]

Eleftheriadis et al.

[11] Patent Number: 6,079,566
[45] Date of Patent: Jun. 27, 2000

[54] SYSTEM AND METHOD FOR PROCESSING OBJECT-BASED AUDIOVISUAL INFORMATION

[75] Inventors: Alexandros Eleftheriadis; Hari Kalva, both of New York; Atul Puri, Riverdale, all of N.Y.; Robert Lewis Schmidt, Howell, N.J.

[73] Assignees: AT&T Corp; The Trustees of Columbia University in the City of New York, both of New York, N.Y.

[21] Appl. No.: 09/055,933

[22] Filed: Apr. 7, 1998

Related U.S. Application Data

[60] Provisional application No. 60/042,800, Apr. 7, 1997.

[51] Int. Cl.[7] .................................................. G06F 17/30
[52] U.S. Cl. ........................... 207/101; 707/103; 707/205
[58] Field of Search .................................... 707/101, 205, 707/103

[56] References Cited

U.S. PATENT DOCUMENTS

| | | | |
|---|---|---|---|
| 5,499,358 | 3/1996 | Nevarez | 707/101 |
| 5,563,648 | 10/1996 | Menand et al. | 348/13 |
| 5,596,565 | 1/1997 | Yonemitsu et al. | 369/275.3 |
| 5,684,804 | 11/1997 | Baronetti et al. | 370/509 |
| 5,708,659 | 1/1998 | Rostoker et al. | 370/392 |
| 5,754,242 | 5/1998 | Ohkami | 348/441 |
| 5,794,250 | 8/1998 | Carino, Jr. et al. | 707/104 |
| 5,875,303 | 2/1999 | Huizer et al. | 395/200.61 |
| 5,886,743 | 3/1999 | Oh et al. | 348/407 |
| 5,946,487 | 8/1999 | Dangelo | 395/705 |

OTHER PUBLICATIONS

J. Laier et al., "Content–Based Mutimedia Data Access in Internet Video Communication", First International Workshop on Wireless Image/Video Communications, Sep. 1996, pp. 126–133.

A. Eleftheriadis et al., "Stored File Format for Object–based Audio Visual Representation", pp. 1–8.

A. Basso et al., "Improved Data Access and Streaming Modes for the MPEG–4 File Format", pp. 1–12.

J. Heid, "Watch This: Streaming Video on Your Web Site", *create WEB*, Apr. 1998, pp. 109–112.

A. Griffin, "Video on the Net", *Popular Mechanics*, Mar. 1998, pp. 51–53.

L. Chiariglione, "MPEG and Multimedia Communications", *IEEE Transactions on Circuits and Systems for Video Technology*, vol. 7, No. 1, Feb. 1997, pp. 5–18.

Y. Fang et al., "Adding Bitstream Input/Output Library in Java", *International Organization for Standardization*, ISO/IEC JTC1/SC29/WG11 MPEG97/M2063, Apr. 1, 1997, pp. 1–6.

A. Puri et al., "APIs for MEG–4 Systems", *International Organization for Standardization*, ISO/IEC JTC1/SC29/WG11 MPEG97/2133, Apr. 1997.

A. Basso et al., "MPEG–4 Integrated Intermedia Format (IIF): Basic Specification", *International Organization for Standardization*, ISO/IEC JTC1/SC29/WG11 MPEG98/M2978, Jan. 16, 1998, pp. 1–22.

*Primary Examiner*—Thomas G. Black
*Assistant Examiner*—William Trinh
*Attorney, Agent, or Firm*—Oliff & Berridge, PLC

[57] ABSTRACT

The invention provides a system and method for processing object-based audiovisual information which is capable of flexibly encoding, storing and accessing a variety of data objects. Audiovisual objects, illustratively prepared in MPEG-4 format, are stored onto physical media using file consisting of segments and access layer primary data units (PDUs), which are accessed using index information. The processes of encoding, storing and accessing audiovisual information are decoupled from monolithic storage in a strict linear order, and reordering and other editorial manipulations are possible.

50 Claims, 3 Drawing Sheets

SYSTEM AND METHOD FOR PROCESSING OBJECT-BASED AUDIOVISUAL INFORMATION

CROSS-REFERENCE TO RELATED APPLICATION

This application is related to U.S. Provisional application Ser. No. 60/042,800, filed Apr. 7, 1997 from which priority is claimed.

BACKGROUND OF THE INVENTION

1. Field of Invention

The invention relates to information processing, and more particularly to advanced storage and retrieval of audiovisual data objects.

2. Description of Related Art

In the wake of rapidly increasing demand for network, multimedia, database and other digital capacity, many multimedia coding and storage schemes have evolved. Graphics files have long been encoded and stored in commonly available file formats such as TIF, GIF, JPG and others, as has motion video in Cinepak, Indeo, MPEG-1 and MPEG-2, and other file formats. Audio files have been encoded and stored in RealAudio, WAV, MIDI and other file formats. These standard technologies have advantages for certain applications, but with the advent of large networks including the Internet the requirements for efficient coding, storage and transmission of audiovisual (AV) information have only increased.

Motion video in particular often taxes available Internet and other system bandwidth when running under conventional coding techniques, yielding choppy video output having frame drops and other artifacts. This is in part because those techniques rely upon the frame-by-frame encoding of entire monolithic scenes, which results in many megabits-per-second data streams representing those frames. This makes it harder to reach the goal of delivering video or audio content in real-time or streaming form, and to allow editing of the resulting audiovisual scenes.

In contrast with data streams communicated across a network, content made available in random access mass storage facilities (such as AV files stored on local hard drives) provide additional functionality and sometimes increased speed, but still face increasing needs for capacity. In particular, taking advantage of the random access characteristics of the physical storage medium, it is possible to allow direct access to, and editing of, arbitrary points within a graphical scene description or other audiovisual object information. Besides random access for direct playback purposes, such functionality is useful in editing operations in which one wishes to extract, modify, reinsert or otherwise process a particular elementary stream from a file.

However, there has not yet emerged a stable and widely available coding and storage scheme which permits flexible, efficient and consistent processing of both streaming and mass-stored AV information in a uniform format, at any level of scene granularity desired.

SUMMARY OF THE INVENTION

The invention overcoming these and other problems in the art relates to a system, method and associated medium for processing object-based audiovisual information which encodes, stores and retrieves not just overall frames, but individual segments containing AV objects which are then assembled into a scene according to embedded file information. The invention consequently provides very efficient streaming of and random access to component AV objects for even complex scenes.

The invention accomplishing these and other objectives in one aspect relates to a method of composing and extracting data in a file, and to a medium storing that type of file, with the file containing a header having streaming information, physical object information and logical object information, and a sequence of audiovisual segments containing audiovisual objects and a segment object data table pointing to access information, to access the audiovisual objects in each audiovisual segment. The invention in another aspect relates to a system for processing data in a file, with the file containing a header having streaming information, physical object information and logical object information, and a sequence of audiovisual segments containing audiovisual objects and a segment object data table pointing to access information.

Among other features and advantages, the system, method and medium of the invention provides a hierarchical, abstracted access layer to the underlying component AV objects which can be readily accessed in random fashion and assembled into a scene, whether in original or edited form. The invention easily allows the flexible editing of AV objects including object insertion, deletion and modification to freely alter the audiovisual presentation, for instance to rearrange scenes or audio tracks in a movie. The AV objects making up a scene are separately encoded and stored in file segments, and composition data for composing scenes out of those constituent objects is separately stored and can be randomly accessed and readily edited as well. Moreover the invention is capable of processing MPEG-1, MPEG-2, audio, video and systems data files, along with coded MPEG-4 data with its extended capabilities.

The system, method and medium of the invention is portable and independent of the platform selected or the storage media used, whether it be DVD, hard disk, CD-ROM or other storage technology. The invention provides for special mechanisms to segment and index encapsulated AV objects to achieve random access. All AV objects and binary format scene description (BIFS) information is encapsulated in access layer (AL) protocol data units (PDUs) in the case of non-streaming files, and in flexible multiplexing (Flex Mux, known in the art) or other suitable multiplex formats for streaming files. The invention allows a streaming format, enabling the storage of multiplexed PDUs that can be transferred directly over a network.

BRIEF DESCRIPTION OF THE DRAWINGS

The invention will be described with reference to the accompanying drawings, in which like elements are designated by like numbers and in which.

DETAILED DESCRIPTION OF PREFERRED EMBODIMENTS

The invention will be illustratively described in terms of the MPEG-4 file format. MPEG-4 files use ".mp4" as the format-identifying extension. In general terms, all AV objects stored in an MPEG-4 file which are related to a session which processes or presents an audiovisual scene, and conforming to MPEG-4, reside in one or more such files. A session does not need to be contained in only one file under MPEG-4. Rather, a set of files can be used to form a complete session, with one of them acting as the master file. Other objects (referred to as "logical objects" or "remote objects") can be referenced by the master (or other) files using universal resource locator calls (URLs, known in the art). These objects can be physically located in a different file on the same file storage system, or in a remote file system such as an Internet server.

Figure 1:
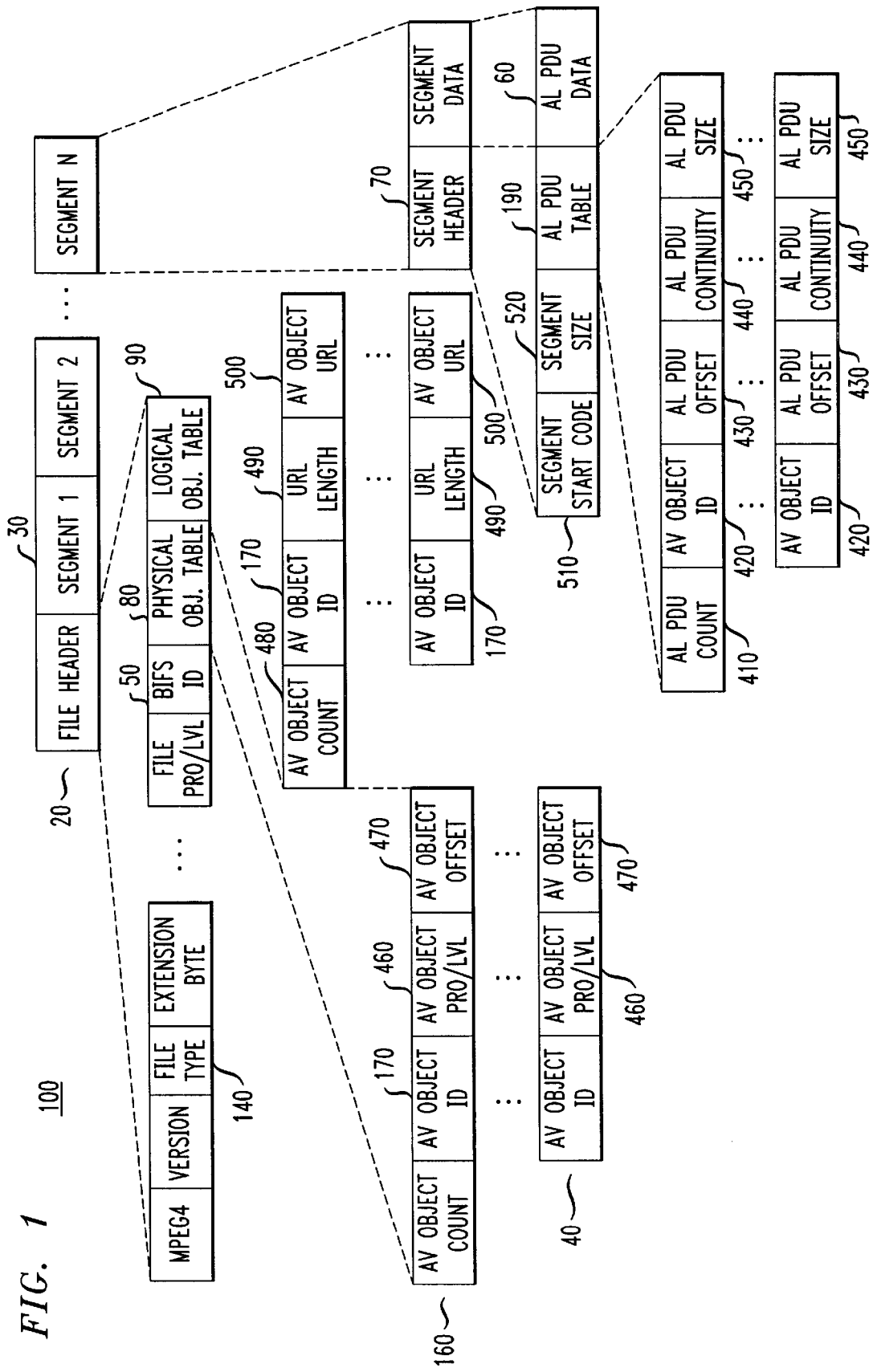
FIG. 1 illustrates a file format structure for stored files according to a first illustrative embodiment of the invention.
Figure 2:
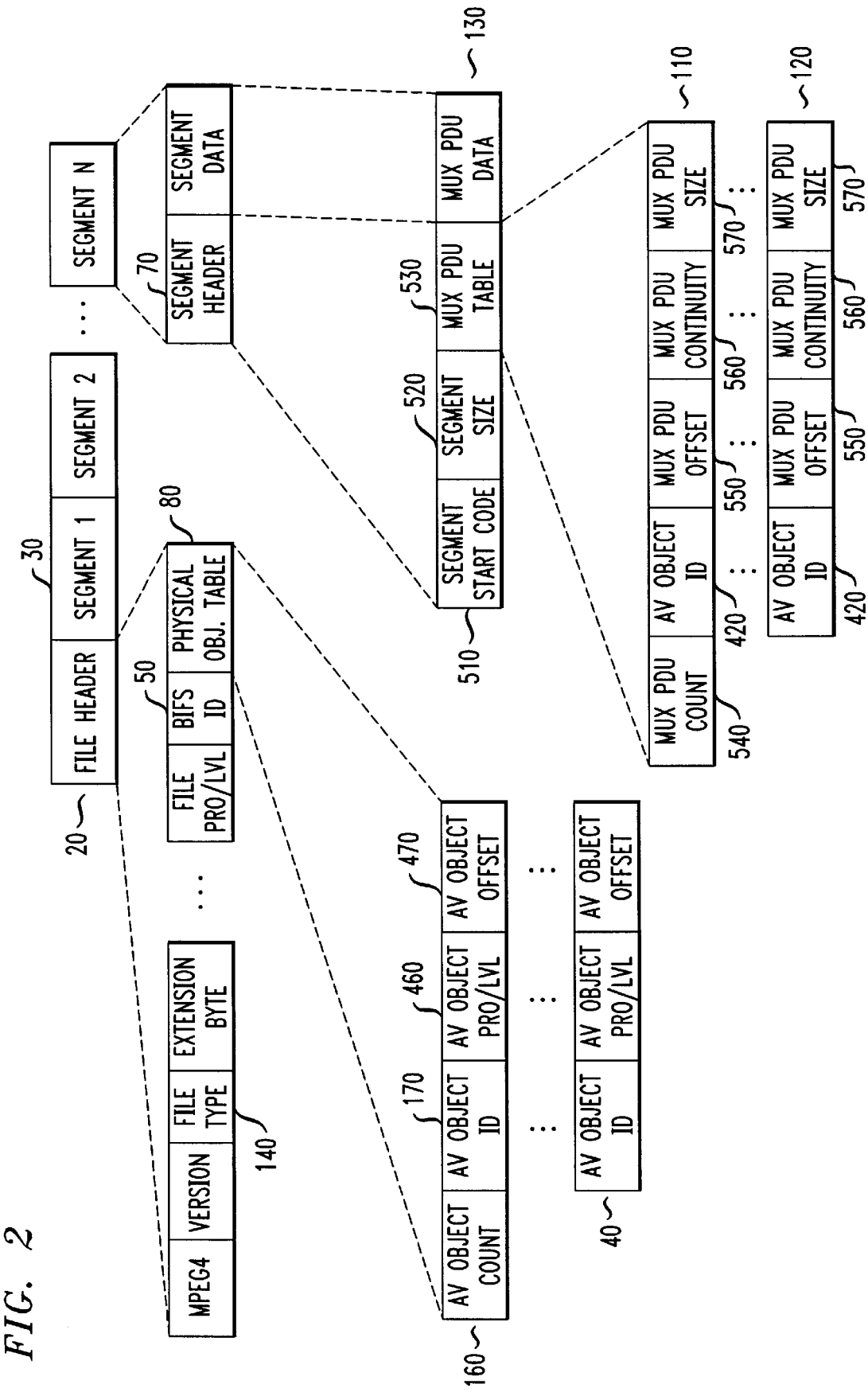
FIG. 2 illustrates a file format structure for streaming files according to a second illustrative embodiment of the invention.

An overview of the invention is shown in FIG. 1 for a first illustrative embodiment relating to a system using stored files, and FIG. 2 for a second illustrative embodiment relating to a system using streaming files. In a streaming implementation, the user views incoming audiovisual portions as they arrive, which may be temporarily stored in electronic memory such as RAM or equivalent memory, but the audiovisual data is not necessarily assembled into a fixed file. In either case, an MPEG-4 file 100 consists of a file header 20 containing global information about the AV objects contained within it, followed by an arbitrary number of segments 30 containing the AV objects within AL PDUs 60 and BIFS data consistent with the MPEG-4 standard known in the art. AV objects 40 can represent textual, graphical, video, audio or other information.

In terms of the AL PDU, BIFS and related data structures under MPEG-4, that standard uses an object-based approach. Individual components of a scene are coded as independent objects (e.g. arbitrarily shaped visual objects, or separately coded sounds). The audiovisual objects are transmitted to a receiving terminal along with scene description information, which defines how the objects should be positioned in space and time, in order to construct the scene to be presented to a user. The scene description follows a tree structured approach, similar to the Virtual Reality Modeling Language (VRML) known in the art. The encoding of such scene description information is more fully defined in Part 1 of the official ISO MPEG-4 specification (MPEG-4 Systems), known in the art. BIFS information is transmitted in its own elementary stream, with its own time and clock stamp information to ensure proper coordination of events at the receiving terminal.

In terms of the Adaptation Layer (AL) in the MPEG-4 environment, since MPEG-4 follows an object-based architecture, several elementary streams may be associated with a particular program (AV presentation). Each elementary stream is composed of Access Units (AUs). An Access Unit can correspond, for example, to a frame of video, or a small set of samples in an audio stream. In general, AUs are assumed to be distinct presentation units. In order to provide a uniform way of describing important information about the AUs carried in each elementary stream (clock reference, time stamps, whether a particular AU is a random access point, etc.) an Adaptation Layer is used to encapsulate all AUs. The AL is a simple (configurable) header structure which allows access to such information without parsing of the actual underlying encoded media data. The AL is positioned hierarchically about the option FlexMux and directly below the coding layer.

As illustrated in FIG. 1, in a storage embodiment the AL PDUs 60 are interspersed within file segments 30. Each file segment 30 contains a header 70 describing the AL PDUs 60 located within that file segment 30. The MPEG-4 file 100 thus contains a set of AL PDUs 60 multiplexed and indexed such that random access of individual objects (encapsulated in the AL PDUs) is possible, at a level of abstraction higher than the physical storage medium that the objects are stored in. This decoupling of audiovisual objects from the physical storage allows highly flexible and general manipulation of these data types.

To stream the content of a file for playback, such as from a web server to an Internet client, the index information (physical object table 80 and logical object table 90) is removed and AL PDUs 60 are prepared to be delivered over a channel. A streaming embodiment of the invention is generally illustrated in FIG. 2.

In terms of the streaming environment under MPEG-4, previous versions of MPEG specification provided an explicit definition of how individual elementary streams are to be multiplexed together for transmission as a single bitstream. Since MPEG-4 is intended to be used in a variety of communication environments (from Internet connections to native ATM, or even mobile), MPEG-4 does mandate a particular structure or mechanism for multiplexing. Instead, it assumes a generic model for a transport multiplexer, referred to as a TransMux. For transport facilities that do not conform to that model (e.g. data transmission using the GSM digital cellular telephony standard), MPEG-4 provides the definition of a simple and flexible multiplexer referred to as a FlexMux. Its use, however, is entirely optional. The FlexMux provides a simple multiplexing facility by allowing elementary streams to populate channels within a FlexMux. It also allows multiple media to share a FlexMux PDU, which is useful for low delay and/or low-bandwidth applications.

As illustrated in FIG. 2, in streaming implementation the invention builds an index layer 110 on top of the access unit sub-layer 130 of the Flex Mux layer 130 to index the AL PDUs 60 by object number. In the absence of the indexing information contained in index layer 110, random access of streaming data becomes practically impossible. A file segment 30 can contain part of an AL PDU 60, an entire AL PDU 60, or even more than one AL PDU 60.

As illustrated in both FIGS. 1 and 2, in terms of general formatting the first 5 bytes of the file header 20 contain the characters "M" "P" "E" "G" and "4". The next byte indicates the version number of the file format. The next byte of the file header 20 contains the file type definition (FTD) field 140. FTD field 140 describes the contents of the file according to the following definition.

Bit 0: stored file (set to 1)/streaming file indication.
Bit 1: If set indicates that there are Physical AV Objects present in the stream.
Bit 2: If set indicates that there are Logical AV Objects present in the stream. (always 0 in a streaming file), to be accessed using URL calls to remote MPEG-4 files.
Bit 3: Always 0 for a stored file. In a streaming file, if this bit is set it indicates that the one AL PDU 30 is contained in one transport PDU 150 (this corresponds to a simple mode of operation of the FlexMux). In such cases, access to random objects is possible by accessing transport PDUs 150. (Bit 3 also called the random access flag).
Bits 4:7—Reserved Bit 3 of the FTD field 140, if set, indicates that the transport PDU 150 contains data that belong to one AL PDU 60. If the random access flag is set, the AV object ID field 170 in the transport PDU table 160 indicates the elementary stream ID (ESID) of the AV object contained in the transport PDU 150. Otherwise, the AV object ID field 170 indicates the packet number in the current segment. This is because if the transport PDU 150 contains multiple AV object data (random access flag not set), it cannot be directly used for random access and also cannot be associated with a single ESID.

Following the file type field 180 is a 1 byte extension indicator (followed by possible extension data), and a 1 byte code describing the profile/level of the entire stream. This allows a decoder to determine if it is capable of handling the data in the file. After the file profile field 190 is the BIFS data 50 including Object IDs. The BIFS data 50 is a 2-byte field that identifies the BIFS PDUs in the file. Object IDs are used to uniquely identify the AV objects encapsulated in AL PDUs 60, including the BIFS data.

The next portion is the physical object table 80, which catalogs a description of all the objects in the file that are physically present or contained in the file. The file header 20 next contains a logical object table 90, which catalogs the location of all file objects that are not physically present in the file, but are referenced via URLs to MPEG-4 compliant files illustratively located on the Internet. The URLs are coded as strings (without a terminating null "\0" character), prepended by their length (using 8 bits).

While illustrated in FIG. 1, the physical object table 80 is optional. Physical object table 80 is necessary only when local media access is to be performed, and when present it is contained in the file header 20. Physical object table 80 consists of a 2 byte AV Object count 160, indicating the number of AV Objects in the file, followed by a sequence of 2 byte AV Object IDs 170 and 1-byte Profile fields 460 containing profile/level descriptions for each AV Object present in the file. Each AV Object description also contains 8 additional bytes in AV Object Offset 470 to indicate the offset (from the beginning of the file) to the segment in which the AV Object or BIFS information first occurs in the stream.

Similarly, the logical object table 90 is only necessary for a stored file implementation, and is not part of a streaming file implementation. When present, the logical object table 90 is also contained in the file header 20. The logical object table 90 consists of a 2 byte AV Object Count 480 indicating the AV Objects that are part of the session, but not physically present in the MPEG file 100. The count data is followed by a 2 byte AV Object ID 170 (also known as the aforementioned elementary stream ID) and a 1 byte URL Length field 490 indicating object location string length, and an AV Object URL 500 the string indicating the location (an Internet Universal Resource Locator, or URL familiar to persons skilled in the art) of each AV Object in the table. The file pointed to by the URL is also in MPEG-4 file format. (It is up to the creator of the file content to ensure that the ID used exists in the remote file and is not duplicated in the local file).

The incorporation of logical objects in the invention facilitates the use of a set of distributed files to store an assembled MPEG-4 presentation. The MPEG file 100 comprises one or more file segments 30, uniquely identified by a 32-bit start code (0x000001B9). A special code denotes the end of the file (0x000001FF).

As illustrated in FIG. 1, following a segment start code 510 and segment size field 520 is an AL PDU table 190, which contains a 2-byte count field 410, indicating how many AL PDUs 60 are contained in the given file segment 30. AL PDU Table 190 also contains a sequence of AV Object IDs 420, AL PDU Offset 430, and AL PDU Continuity field 440 and AL PDU Size field 450. For each AL PDU, an 8-byte structure is used to describe the object contained. The first 2 bytes are the AV Object ID 420, and the next 4 bytes indicate the AL PDU Offset 430 to the starting point of that AL PDU in the segment 30. The next two bits are the AL PDU Continuity field 440, representing a "continuity flag", and have the following meaning:

00: complete PDU
01: 1$^{st}$ segment of a split PDU; next segment follows; look in the segment tables
10: Last segment of a split PDU
11: intermediate segment of a split PDU; look in the PDU table to locate the next PDU segment.

The remaining 14 bits are the AL PDU Size field 450 giving the size (in bytes) of the part of the AL PDU 60 contained therein. Following the AL table there is a 4-byte segment size field that denotes the number of bytes until the beginning of the next segment start code or end-of-data code.

The stored format of the first illustrative embodiment of the invention for MPEG-4 files supports random accessing of AV objects from local media. Accessing an AV object at random by object number involves looking up the AL PDU table 190 of a file segment 30 for the object ID. If the ID is found, the corresponding AL PDU 60 is retrieved. Since an access unit can span more than one AL PDU 60, it is possible that the requested object is encapsulated in more than one AL PDU 60. So to retrieve all the AL PDUs 60 that constitute the requested object, all the AL PDUs 60 with the requested object ID are examined and retrieved until an AL PDU 60 with the first bit set is found. The first bit of an AL PDU 60 indicates the beginning of an access unit. If the ID is not found, the AL PDU table 190 in the next segment is examined. All AL PDU 60 segments are listed in the AL PDU table 190. This also allows more than one object (instance) with the same ID to be present in the same segment. It is assumed that AL PDUs 60 of the same object ID are placed in the file in their natural time (or playout) order. Generally similar structures are presented in the second illustrative embodiment shown in FIG. 2, but reflecting streamed rather than stored access, including MUX PDU Table 530 containing a corresponding MUX PDU Count 540, MUX PDU Offset 550, MUX PDU Table 560 and MUX PDU Size field 570.

Figure 3:
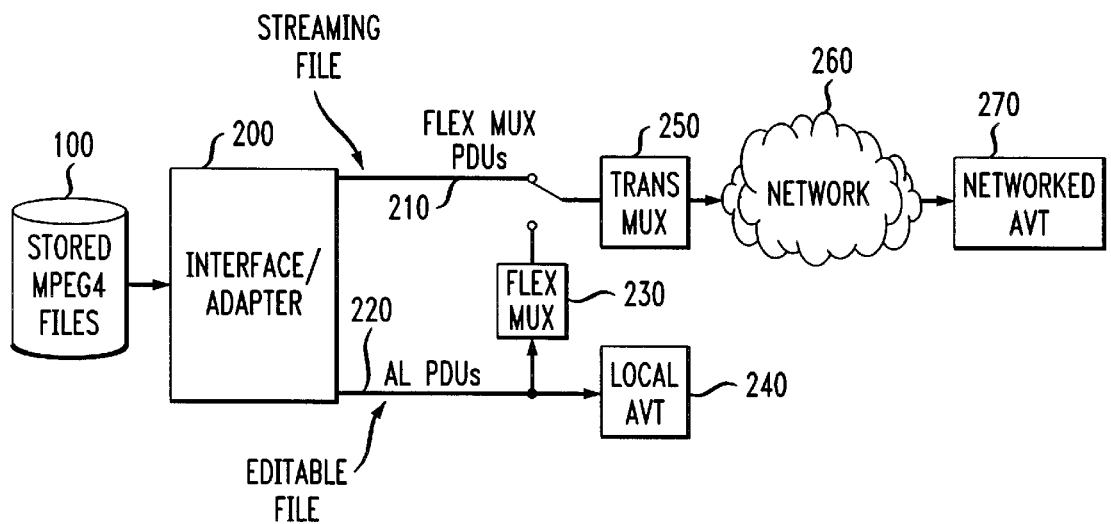
FIG. 3 illustrates an apparatus for storing audiovisual objects to audiovisual terminals according to the invention.

In terms of delivery of data encapsulated according to the invention, the AV objects stored in an MPEG-4 file 100 may be delivered over a network such as the Internet, cellular data or other networks for streaming data, or accessed from a local storage device for playback from mass storage. The additional headers added to facilitate random access are removed before a file can be played back. FIG. 3 illustrates an apparatus for processing an MPEG-4 file 100 for playback according to the invention. In the illustrated apparatus, MPEG-4 files 100 are stored on a storage media, such as a hard disk or CD ROM, which is connected to a file format interface 200 capable of programmed control of audiovisual information, including the processing flow illustrated in FIG. 4.

The file format interface 200 is connected to a streaming file channel 210, and to an editable file channel 220. Streaming file channel 210 communicates Flex Mux PDUs to Trans Mux 250, which is in turn connected to data communications network 260. Data communications network 260 is in turn connected to an audiovisual terminal 270, which receives the streamed audiovisual data. File format interface 200 is also connected to Flex Mux 230 and to a local audiovisual terminal 240 by way of editable file channel 220. The apparatus illustrated in FIG. 3 can therefore operate on streamed audiovisual data at the networked audiovisual terminal 270, or operate on mass-stored audiovisual data at the local audiovisual terminal 240.

The invention illustratively uses a file format specified as limited to 64K local objects and 64K remote objects. Furthermore, file segments 30 are limited to a size of 4 GB. The offsets to individual objects in the physical and logical object tables limit the total size of the file to a 64-bit address space.

Using all of these techniques and structures, the system, method and medium of the invention enables new applications that make use of a variety of random access AV features. Types of client applications foreseen by the inventors include video and audio conferencing, video gaming and other interactive entertainment. The file format associated with the invention can be used to arrange audiovisual data efficiently on a storage device such as a DVD, CD ROM, hard disk or other devices. Necessary control structures can be realized in hardware as well as software, as will be appreciated by persons skilled in the art, and the design of software or devices that utilize the file format will depend on particular applications.

Figure 4:
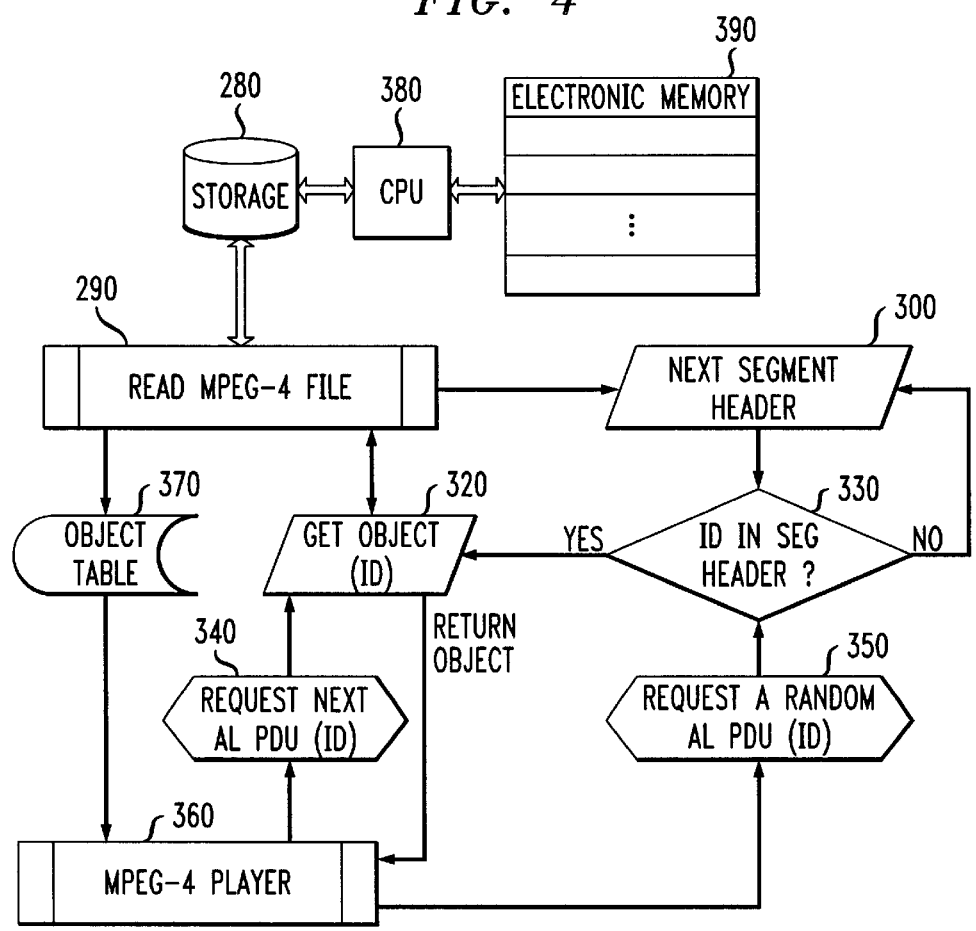
FIG. 4 illustrates a logical apparatus for extracting audiovisual data stored and accessed according to the invention.

FIG. 4 illustrates a schematic diagram of another logical apparatus using the file format specification to access units from an MPEG-4 file 100 according to the invention. This is an illustrative embodiment of an MPEG-4 apparatus comprising CPU 380, which may for example be a general or special purpose microprocessor, electronic memory 390, associated bus connections and other components, as will be appreciated by persons skilled in the art. In this illustrative embodiment the CPU 380 posts requests to random objects by specifying the object ID (elementary stream ID). Other component blocks in FIG. 4 are depicted logically, and may correspond to software or hardware modules according to design needs, and in which blocks could be combined, as will also be appreciated by persons skilled in the art.

In the diagram of FIG. 4, CPU 380 accesses storage device 280 (such as a hard drive) to cause a read operation to be performed on an MPEG-4 file at module 290, and a next segment header is read at module 300. The read operation module 290 accesses an object table 370 for translation purposes, and communicates extracted audiovisual data to MPEG-4 player 360, which may comprise a video buffer, screen, audio channels and related output devices. ID check module 330 checks for an ID in the segment header, transmitting the ID to the Get Object ID module 320, or if not present moving back to next segment module 300. After MPEG-4 player 360 has finished presenting the current audiovisual data, it transmits a request through request module 340 for the next AL PDU (ID), or may request a random AL PDU (ID) through module 350, which in turn communicates that information to the ID check module 310.

As noted above, the way in which AV objects are accessed from a file depends on the intended application and hence the way the client applications are designed. One significant purpose of the invention is to provide underlying universal support for easy access of individual AV objects from any storage device. Of course, any client application employing the invention must have a module that retrieves AV objects from a file. The functionality of this front-end component includes retrieving AV objects by their ESID, retrieving the composition information, retrieving the $n^{th}$ occurrence of an object in the elementary stream. The reader will parse the segment headers for the presence of an object in that segment. If the object is not present in the segment, it scans the next segment. This is repeated until the desired object is found or the end of the file marker is reached.

The foregoing description of the system, method and medium for processing audiovisual information of the invention is illustrative, and variations in construction and implementation will occur to persons skilled in the art. The scope of the invention is there intended to be limited only by the following claims.

What is claimed is:

1. A method of composing data in a file, comprising the steps of:

generating a file header, the file header comprising streaming information, physical object information and logical object information;

generating a sequence of audiovisual segments, each audiovisual segment comprising a plurality of audiovisual objects and a segment object data table having entries containing pointers to access information, the access information being used to access the audiovisual objects in each audiovisual segment; and associating the audiovisual objects with entries in the segment object data table.

2. The method of claim 1, further comprising the step of using the physical object information to translate references to the audiovisual objects into local media addresses using a physical object table, when the physical object information indicates that local media data are present.

3. The method of claim 1, further comprising the step of using the logical object information to translate references to the audiovisual objects into remote data calls, when the logical object information indicates that remote data are present.

4. The method of claim 1, wherein the audiovisual objects are accessible over a network on a streaming basis.

5. The method of claim 1, wherein the audiovisual objects are accessed from a mass storage medium.

6. The method of claim 1, wherein the file is an MPEG-4 file.

7. The method of claim 1, wherein the audiovisual objects are produced from different sources.

8. The method of claim 1, wherein the audiovisual objects are randomly accessible.

9. The method of claim 1, wherein the segment object data table comprises an audiovisual object ID field storing identifications of individual audiovisual objects, and the access information for each audiovisual object.

10. The method of claim 1, wherein the access information comprises offset information, continuity information, size information and count information for the audiovisual objects.

11. The method of claim 1, wherein the sequence of audiovisual segments comprises a termination segment indicating the end of the file.

12. The method of claim 1, wherein the audiovisual objects comprise protocol data units accessed through the segment object data table.

13. A method of extracting data from a file, comprising the steps of:

accessing a file header, the file header comprising streaming information, physical object information and logical object information;

accessing an audiovisual segment, the audiovisual segment comprising a plurality of audiovisual objects and a segment table having entries containing pointers to access information, the access information being used to access the audiovisual objects; and accessing a sequence of audiovisual segments using entries in the segment object table.

14. The method of claim 13, further comprising the step of using the physical object information to translate references to the audiovisual objects to local media addresses using a physical object table, when the physical object information indicates that local media data are present.

15. The method of claim 13, further comprising the step of using the logical object information to translate references to the audiovisual objects to remote data calls, when the logical object information indicates that remote data are present.

16. The method of claim 13, further comprising the step of assembling the audiovisual objects into a scene.

17. The method of claim 13, wherein the audiovisual objects are accessible over a data network on a streaming basis.

18. The method of claim 13, wherein the audiovisual objects are accessed from a mass storage medium.

19. The method of claim 13, wherein the file is an MPEG-4 file.

20. The method of claim 13, further comprising the steps of:

editing the audiovisual objects; and restoring the audiovisual objects in the file.

21. The method of claim 13, wherein the audiovisual objects are produced from different sources.

22. The method of claim 13, wherein the audiovisual objects are randomly accessible.

23. The method of claim 13, wherein the segment object data table comprises an audiovisual object ID field storing identifications of individual audiovisual objects, and the access information for each audiovisual object.

24. The method of claim 13, wherein the access information comprises offset information, continuity information, size information and count information for the audiovisual objects.

25. The method of claim 13, further comprising the step of terminating the extraction of data upon reading a termination segment.

26. The method of claim 13, wherein the audiovisual objects comprise primary data units accessed through the segment object data table.

27. A system for processing a data file, comprising:

a processor unit;

a storage unit, connected to the processor unit, the storage unit storing a file comprising:

a file header, the file header comprising streaming information, physical object information and logical object information;

a sequence of audiovisual segments, each audiovisual segment comprising a plurality of audiovisual objects and a segment object data table having entries containing pointers to access information, the access information being used to access the audiovisual objects; and the audiovisual objects being associated with the entries in the segment object data table.

28. The system of claim 27, wherein the system translates references to the audiovisual objects into local media addresses using a physical object table, when the physical object information indicates that local media data are present.

29. The system of claim 27, wherein the system translates references to the audiovisual objects into remote data calls, when the logical object information indicates that remote data are present.

30. The system of claim 27, wherein the audiovisual objects are accessible over a network on a streaming basis.

31. The system of claim 27, wherein the storage unit comprises a mass storage medium.

32. The system of claim 27, wherein the file is an MPEG-4 file.

33. The system of claim 27, wherein the audiovisual objects are produced from different sources.

34. The system of claim 27, wherein the audiovisual objects are randomly accessible from the storage unit.

35. The system of claim 27, wherein the segment object data table comprises an audiovisual object ID field storing identifications of individual audiovisual objects, and the access information for each audiovisual object.

36. The system of claim 27, wherein the access information comprises offset information, continuity information, size information and count information for the audiovisual objects.

37. The system of claim 27, wherein the sequence of audiovisual segments comprises a termination segment indicating the end of the file.

38. The system of claim 27, wherein the audiovisual objects comprise primary data units accessed through the segment object data table.

39. A medium for storing a data file, the data file including information for processing by an information processing apparatus to perform the steps of:

generating or accessing a file, the file comprising a file header, the file header comprising streaming information, physical object information and logical object information, and an audiovisual segment, the audiovisual segment comprising a plurality of audiovisual objects and a segment object data table having entries containing pointers to access information, the access information being used to access the audiovisual objects; and generating or accessing the audiovisual objects using entries in the segment object data table.

40. The medium of claim 39, wherein the file comprises a physical object table which translates references to the audiovisual objects into local media addresses, when the physical object information indicates that local media data are present.

41. The medium of claim 39, wherein the file translates references to the audiovisual objects into remote data calls, when the logical object information indicates that remote data are present.

42. The medium of claim 39, wherein the audiovisual objects are accessible over a network on a streaming basis.

43. The medium of claim 39, wherein the medium comprises a mass storage medium.

44. The medium of claim 39, wherein the file is an MPEG-4 file.

45. The medium of claim 39, wherein the audiovisual objects are produced from different sources.

46. The medium of claim 39, wherein the audiovisual objects are randomly accessible from the medium.

47. The medium of claim 39, wherein the segment object data table comprises an audiovisual object ID field storing identifications of individual audiovisual objects, and the access information for each audiovisual object.

48. The medium of claim 39, wherein the access information comprises offset information, continuity information, size information and count information for the audiovisual objects.

49. The medium of claim 39, wherein the sequence of audiovisual segments comprises a termination segment indicating the end of the file.

50. The medium of claim 39, wherein the audiovisual objects comprise primary data units accessed through the segment object data table.

* * * * *